J. B. KLINE.
ANIMAL TRAP.
APPLICATION FILED FEB. 24, 1912.
1,054,564.
Patented Feb. 25, 1913.
3 SHEETS—SHEET 2.
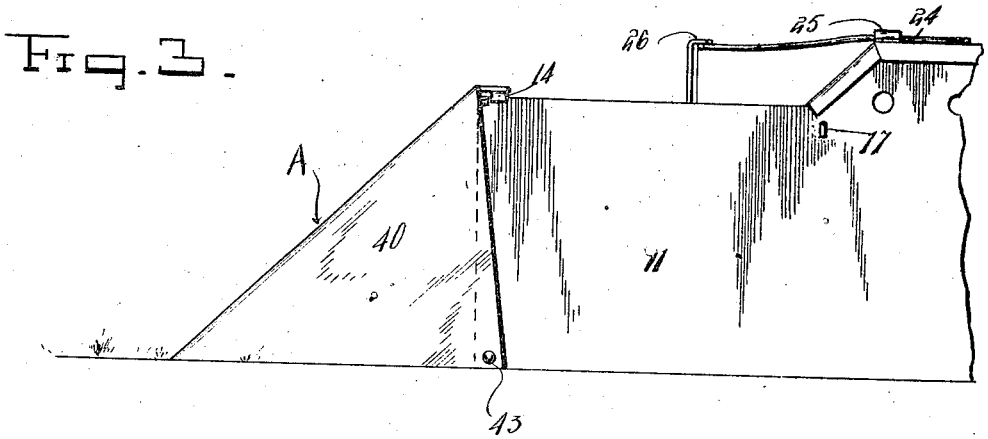
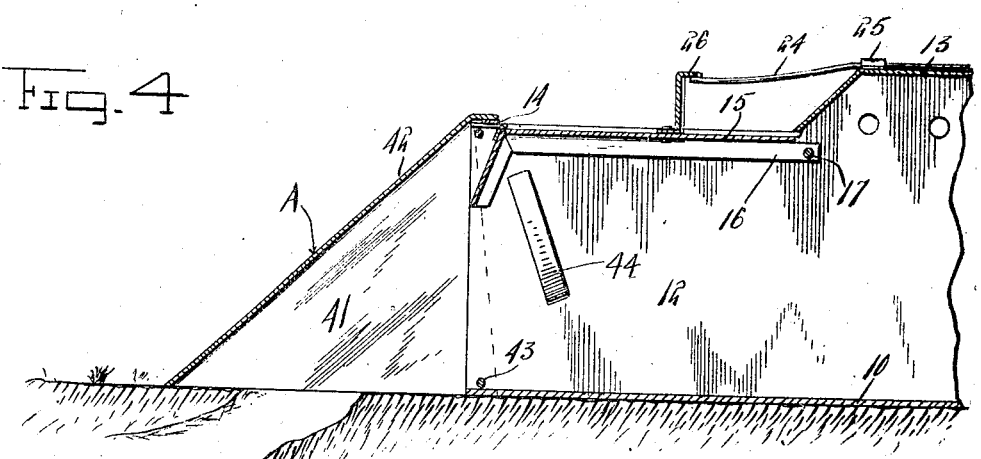
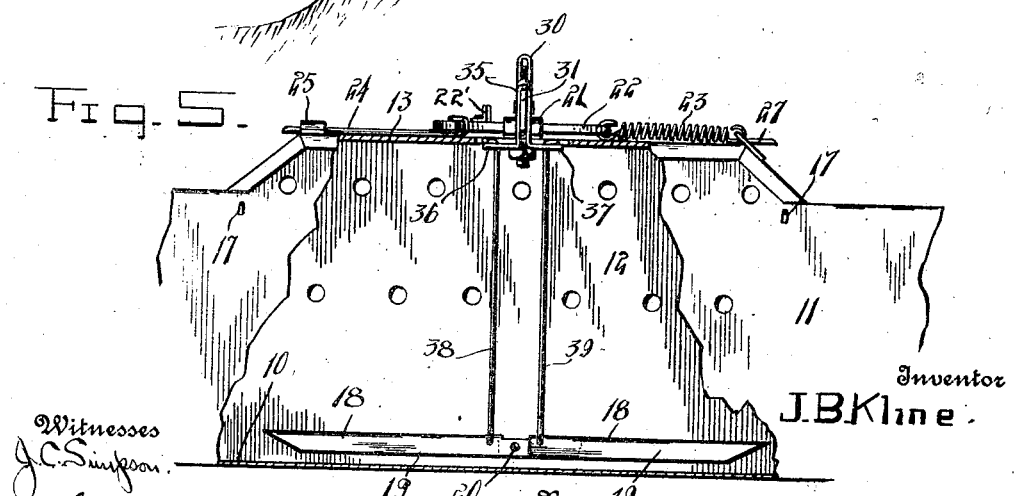
Witnesses
J. C. Simpson
Henry T. Bright
Inventor
J. B. Kline
By
Attorneys

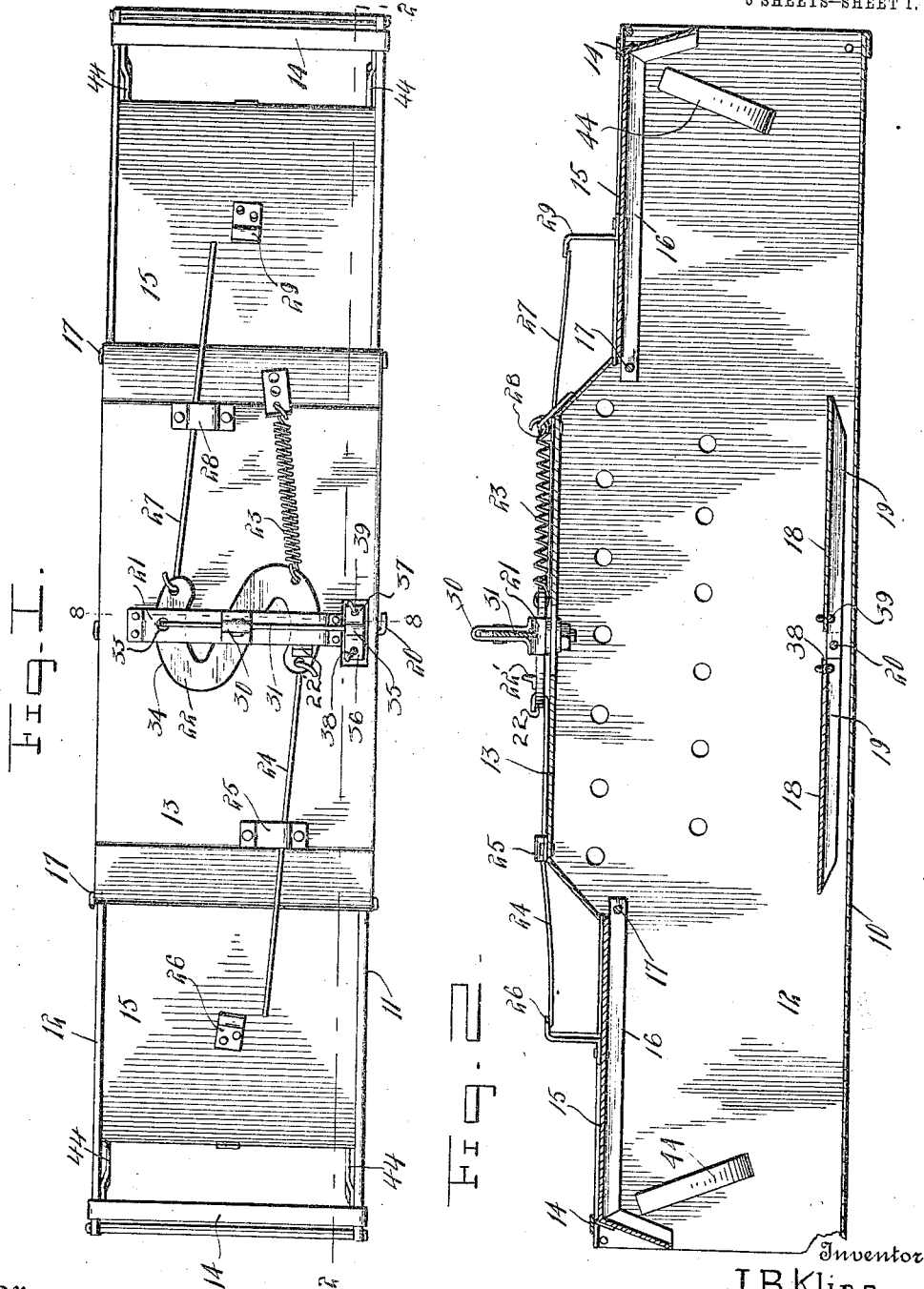

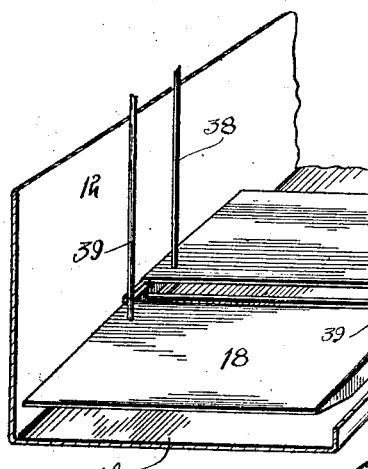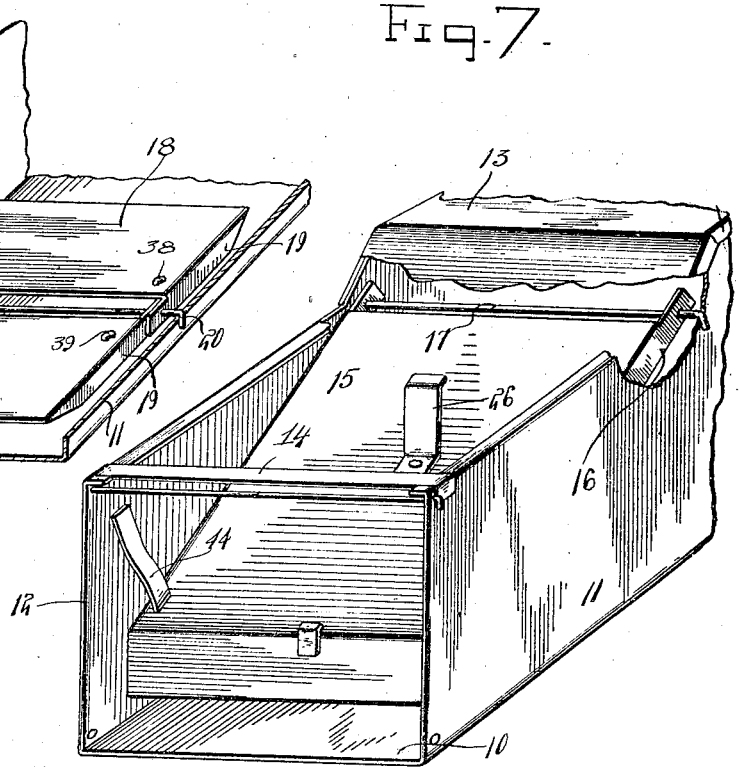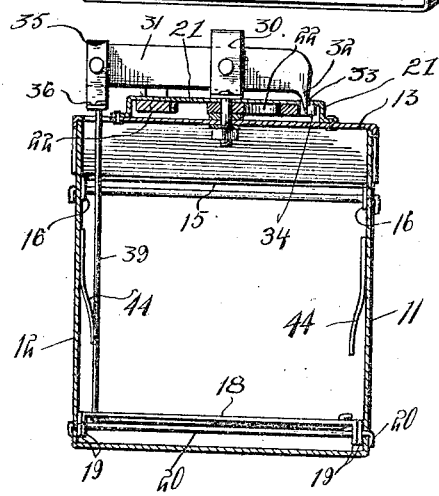

UNITED STATES PATENT OFFICE.

JACOB B. KLINE, OF THURMAN, IOWA.

ANIMAL-TRAP.

1,054,564. Specification of Letters Patent. Patented Feb. 25, 1913.

Application filed February 24, 1912. Serial No. 679,546.

*To all whom it may concern:*

Be it known that I, JACOB B. KLINE, a citizen of the United States, residing at Thurman, in the county of Fremont, State of Iowa, have invented certain new and useful Improvements in Animal-Traps; and I do hereby declare the following to be a full, clear, and exact description of the invention, such as will enable others skilled in the art to which it appertains to make and use the same.

This invention relates to animal traps.

The object of the invention resides in the provision of an animal trap in which the weight of the animal trips the doors controlling the entrance to the trap and which further includes an improved structure for setting and tripping the doors.

A further object of the invention resides in the provision of an animal trap, which will be simple in construction, efficient in use and which may be manufactured at a comparatively small cost.

With the above and other objects in view, the invention consists in the details of construction and in the arrangement and combination of parts to be hereinafter more fully described and particularly pointed out in the appended claim.

In describing the invention in detail, reference will be had to the accompanying drawings wherein like characters of reference denote corresponding parts in the several views, and in which—

Figure 1 is a plan view of the improved trap with the doors in closed or released position, Fig. 2, a section on the line 2—2 of Fig. 1 with the entrance doors of the trap set, Fig. 3, a side elevation of one end of the trap showing the detachable hood associated therewith, Fig. 4, a longitudinal section of what is shown in Fig. 3, Fig. 5, a side elevation of the central portion of the trap showing the tripping platforms set and the various connections between the platform and the trigger which controls the release of the entrance doors, Fig. 6, a detail perspective view showing the manner of mounting the tripping platform, Fig. 7, a detail perspective view showing the manner of mounting the entrance doors, Fig. 8, a section on the line 8—8 of Fig. 1.

Referring to the drawings the trap is shown as comprising a trough like body portion which includes a bottom 10 and parallel side members 11 and 12. These side members are connected together centrally at their upper edges by a top portion 13 and are also connected together at corresponding ends by brace bars 14. Pivoted between the side members 11 and 12 at each end of the top portion is an entrance door 15. Each of these entrance doors 15 has its side edges turned inwardly to form flanges 16 and the inner ends of these flanges are extended beyond the inner end of the door. Passing through the extension of these flanges and through the side members 11 and 12 is a pivot rod 17 the terminals of which are bent laterally upon the outer faces of the side members 11 and 12. By this construction a simple and efficient pivotal connection for the entrance doors 15 is had. The trap is provided centrally of its bottom 10 with oppositely disposed tripping platforms 18 the side edges of each of which are turned at an angle to form flanges 19 and these flanges are extended and disposed in overlapping relation at the adjacent ends of said platforms. Passing through the overlapping extensions of the flanges 19 is a pivot rod 20. This rod also passes through the side members 11 and 12 and has its terminals bent laterally upon the outer faces of said side members respectively. By this construction it will be apparent that there is provided an efficient pivotal mounting for the platforms 18.

Mounted upon the outer face of the top portion 13 transversely of the latter is a U-shaped bracket 21 and pivoted centrally between this bracket and the top portion 13 is an S-shaped lever 22 which is normally held in the position shown in Fig. 1 by a spring 23 one end of which is secured to said lever while the other end thereof is suitably anchored to the top portion 13. The movement of the lever 22 under the influence of the spring 23 is limited by means of a stop 22' carried by said lever and adapted to engage the bracket 21.

Pivotally connected to one end of the lever 22 is a sear arm 24 which extends through a guide 25 mounted on the top portion 13 and has its other end disposed in position to engage a catch 26 carried by one of the entrance doors 15. Pivotally connected to the other end of the lever 22 is a sear arm 27 which also extends through a guide 28 mounted on the top portion 13 and has its other end disposed in position to engage a catch 29 carried by the entrance door 15 opposite to the entrance door provided with the catch 26. Mounted upon the bracket 21 is another bracket 30 in which is pivoted a trigger 31. One end of this trigger 31 is provided with a downwardly-extending point 32 which is adapted to pass through an opening 33 in the bracket 21 and engage a notch 34 in the lever 22 to hold said lever against movement under the influence of the spring 23 as will hereinafter appear. Embracing the trigger 31 adjacent the end thereof remote from the point 32 is a U-shaped member 35 having the free ends of its arms projected laterally to form ears 36 and 37. Secured to the ear 36 and passing through the top portion 13 is a link 38 and the lower end of this link is suitably connected to one of the tripping platforms 18. Another link 39 is connected to the ear 37 and passes through the top portion 13, the lower end of this link 39 being suitably connected to the other tripping platform 18.

From the construction previously described it will be apparent that by elevating the free ends of the doors 15 and then rotating the lever 22 to the right, the free ends of the sear arms 24 and 27 will be brought into engagement with respective catches 26 and 29 on the doors 15 so as to hold the free ends of said doors elevated. When the catches are thus engaged with the respective sear arms the trigger 31 is operated to force the point 32 through the opening 33 and into engagement with the notch 34 of the lever 22. Upon the lever 22 being then released to the influence of the spring 23 the friction between said lever and the point 32 of the trigger will serve to hold said point in engagement with the notch 34 and thus maintain the entrance doors 15 elevated at their free ends and allow unobstructed access to the interior of the trap by animals. It will be here noted that when the point 32 is moved into engagement with the notch 34 the outer ends of the tripping platforms 18 will be disposed elevated through the medium of the links 38 and 39. When the parts of the trap are in this position it will be apparent that when an animal enters upon either of the platforms 18 the weight of the animal will serve to depress the free end of such platform. This movement of the platform will be imparted to the trigger 31 by either of the links 38 and 39 and raise the point 32 out of engagement with the notch 34 when the spring 23 will operate upon the lever 22 to draw the sear arms 24 and 27 out of engagement with respective catches 26 and 29 and permit the entrance doors to fall to closed position under the influence of gravity.

In order to increase the efficiency of the trap in capturing animals which burrow into the ground there is provided a detachable hood A which includes side portions 40 and 41 and a top 42. This hood is applied at one end of the trap so as to cover the hole in the ground in which the animal lives and has its side portions 40 and 41 disposed in overlapping relation to the side members 11 and 12 respectively and secured to the latter by suitable connections 43. When the hood is so disposed it will be apparent that an animal emerging from the hole covered thereby will be directed into the trap.

It will be noted that there is secured on the inner faces of the side members 11 and 12 at each end thereof leaf springs 44. The lower ends of these springs 44 are free and serve to spring outwardly when the entrance doors 15 are closed across the top of said doors and thereby lock same in closed position so as to prevent the escape of a trapped animal.

What is claimed is:

An animal trap comprising a bottom and parallel spaced side members, a top connecting the intermediate portion of said side members, a vertically swinging entrance door pivoted between the side members at each end of the top, catches carried by each of said doors on their outer faces, a lever pivoted on the outer face of the top, sear arms having their inner ends pivotally connected to opposite ends of said lever respectively and their outer ends adapted to engage respectively the catches on the entrance doors to hold the free ends of the latter in elevated position, a spring constantly tending to move said lever so as to dispose the sear arms in release position, a trigger pivotally supported upon said top and adapted to engage the lever to hold the latter against movement under the influence of said spring, a tripping platform pivoted between the side members inwardly of said entrance doors, and connections between said platform and the trigger whereby the weight of an animal upon said platform will disengage the trigger from the lever and release the latter to the influence of said spring and disengage the sear arms from the entrance door catches.

In testimony whereof, I affix my signature, in presence of two witnesses.

JACOB B. KLINE.

Witnesses:
C. H. PAUL,
W. M. PAUL.